US010554558B2

United States Patent
Ishii et al.

(10) Patent No.: US 10,554,558 B2
(45) Date of Patent: Feb. 4, 2020

(54) DATA DIODE DEVICE

(71) Applicant: MITSUBISHI ELECTRIC CORPORATION, Chiyoda-ku, Tokyo (JP)

(72) Inventors: Masayuki Ishii, Tokyo (JP); Masahiro Ura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 451 days.

(21) Appl. No.: 15/317,342

(22) PCT Filed: Oct. 20, 2015

(86) PCT No.: PCT/JP2015/079505
§ 371 (c)(1),
(2) Date: Dec. 8, 2016

(87) PCT Pub. No.: WO2016/067964
PCT Pub. Date: May 6, 2016

(65) Prior Publication Data
US 2017/0118123 A1    Apr. 27, 2017

(30) Foreign Application Priority Data
Oct. 30, 2014    (JP) .................. 2014-221059

(51) Int. Cl.
*H04L 12/803*    (2013.01)
*H04L 12/66*    (2006.01)
(Continued)

(52) U.S. Cl.
CPC ............ *H04L 47/125* (2013.01); *H04B 7/15* (2013.01); *H04L 5/0055* (2013.01); *H04L 12/66* (2013.01);
(Continued)

(58) Field of Classification Search
CPC ..... H04L 47/125; H04L 47/127; H04L 47/32; H04L 5/0055; H04L 5/1423; H04L 12/28;
(Continued)

(56) References Cited

U.S. PATENT DOCUMENTS 6,690,645 B1 *  2/2004  Aweya ................... H04L 47/10
370/230
7,616,573 B2 * 11/2009  Olesinski ............... H04L 47/10
370/235

(Continued)

FOREIGN PATENT DOCUMENTS

EP    2615802 A1    7/2013
JP    2001-111618 A    4/2001
(Continued)

OTHER PUBLICATIONS

Office Action (Communication pursuant to Article 94(3) EPC) dated Jan. 4, 2019, by the European Patent Office in corresponding European Patent Application No. 15855823.9. (5 pages).
(Continued)

*Primary Examiner* — Chi Tang P Cheng
(74) *Attorney, Agent, or Firm* — Buchanan Ingersoll & Rooney PC

(57) ABSTRACT

In a data diode device that includes a transmitting device, a one-way transmission path and a receiving device, in order to reduce packet loss that occurs when a receiving side is put in an overload state, the transmitting device includes a network load prediction function unit that predicts a network load of a receiving side network from the amount of communication of data sent from a transmitting side network, and a data control unit that discards IP packets of data sent from the transmitting side network when the network load predicted by the network load prediction function unit is determined to be higher than a predetermined value, so as to
(Continued)

limit the amount of communication from the transmitting device.

6 Claims, 10 Drawing Sheets

(51) Int. Cl.
  *H04B 7/15* (2006.01)
  *H04L 5/00* (2006.01)
  *H04L 12/823* (2013.01)
  *H04L 29/06* (2006.01)
(52) U.S. Cl.
  CPC .............. *H04L 47/32* (2013.01); *H04L 63/20* (2013.01); *H04L 69/16* (2013.01)
(58) Field of Classification Search
  CPC . H04L 12/6418; H04L 12/66; H04L 63/0209; H04L 63/20; H04L 69/16; H04B 7/15
  USPC ........................................................ 370/235
  See application file for complete search history.

(56) References Cited

U.S. PATENT DOCUMENTS

| | | | |
|---|---|---|---|
| 2009/0010211 A1* | 1/2009 | Sumasu | H04L 1/0003 370/329 |
| 2010/0257353 A1 | 10/2010 | Cheng | |
| 2010/0290476 A1 | 11/2010 | Brindle et al. | |
| 2013/0182568 A1 | 7/2013 | Lee et al. | |
| 2014/0075535 A1* | 3/2014 | Soffer | H04L 63/0227 726/13 |

FOREIGN PATENT DOCUMENTS

| JP | 2003-281110 A | 10/2003 |
|---|---|---|
| JP | 2005-094249 A | 4/2005 |
| JP | 2008-193324 A | 8/2008 |
| JP | 2009-193324 A | 8/2009 |
| JP | 2011-239277 A | 11/2011 |
| JP | 2012-523170 A | 9/2012 |
| JP | 2014-140096 A | 7/2014 |

OTHER PUBLICATIONS

International Search Report (PCT/ISA/210) dated Dec. 15, 2015, by the Japanese Patent Office as the International Searching Authority for International Application No. PCT/JP2015/079505.
Written Opinion (PCT/ISA/237) dated Dec. 15, 2015, by the Japanese Patent Office as the International Searching Authority for International Application No. PCT/JP2015/079505.
Tadashi Yamamoto et al., "Secure Gateway", Oki 1-12 Technical Review, Oct. 1, 2004, vol. 71, No. 4, pp. 58 to 61 (with partial English language translation, 1 page).
Honggang, "Research on Packet Loss Issues in Unidirectional Transmission", Journal of Computers, (Oct. 2013), vol. 8, No. 10, pp. 2664-2671.
Extended European Search Report dated May 2, 2018, issued by the European Patent Office in corresponding European Application No. 15855823.9. (7 pages).

* cited by examiner

DATA DIODE DEVICE

TECHNICAL FIELD

The present invention relates to a data diode device that causes data to flow through a communication path of a gateway in completely one direction.

BACKGROUND

A data diode device is a network relay device that causes data to flow through a communication path of a gateway in only one direction for security countermeasures. By blocking data flow in the opposite direction, a connection device can be defended against a virus attack and hacking.

In addition, since the data diode device is a network relay device, it is necessary to reduce packet loss in the data diode device.

In a conventional network relay device, two-way communication including a transmission side network and a receiving side network is provided. Thus, in a system in which security countermeasures are required, unnecessary communications from the outside are interrupted by a firewall.

However, in recent years, for a system in which a higher level of security is required, a data diode device is developed as a network relay device for achieving complete one-way communication.

Further, a conventional network relay device is capable of detecting packet loss due to IP packet congestion; in this case, the IP packet congestion is resolved by suspending the communication by a pause frame and the like (see Patent Literature 1).

CITATION LIST

Patent Literature

Patent Literature 1: JP-A-2008-193324 (FIG. 1)

SUMMARY OF INVENTION

Technical Problem

In a data diode device of the present invention, in order to achieve complete one-way communication, a transmitting device and a receiving device in the data diode device are connected by a one-way transmission path. Therefore, it is impossible to notify the transmitting device and the transmitting-side network of the state of the receiving device and an ACK packet at the time of receiving data.

If data exceeding the processing capacity of the receiving device are transmitted, the receiving device is put in an overload state in which communication processing cannot be performed, thus, packet loss occurs. However, since the transmitting device cannot grasp the state of the receiving device, it continues to transmit data regardless of the state of the receiving device. As a result, packet loss occurs until the overload state of the receiving device is resolved.

The present invention has been made to solve the above problems, and provides a data diode device that prevents the receiving device from being put in an overload state to reduce packet loss in the data diode device.

Solution to Problem

The present invention provides a data diode device that is installed between a transmitting side network and a receiving side network, and includes a transmitting device, a one-way transmission path and a receiving device, wherein the transmitting device includes a network load prediction function unit that predicts a network load of the receiving side network from the amount of communication of data sent from the transmitting side network, and a data control unit that discards IP packets of data sent from the transmitting side network when the network load predicted by the network load prediction function unit is determined to be higher than a predetermined value.

Further, the present invention provides a data diode device that is installed between a transmitting side network and a receiving side network, and includes a transmitting device, a one-way transmission path and a receiving device, wherein the transmitting device includes a receiving device load prediction function unit that predicts a load of the receiving device from the amount of communication of data sent from the transmitting side network, and a data control unit that discards IP packets of data sent from the transmitting side network when the load of the receiving device predicted by the receiving device load prediction function unit is determined to be higher than a predetermined value.

Advantageous Effects of Invention

With this configuration, the load of the receiving device in the data diode device can be reduced, and packet loss due to the overload of the receiving device can be reduced.

DESCRIPTION OF EMBODIMENTS

First Embodiment

A data diode device according to a first embodiment of the present invention will now be described in detail with reference to FIGS. 1 and 2.

Figure 1:
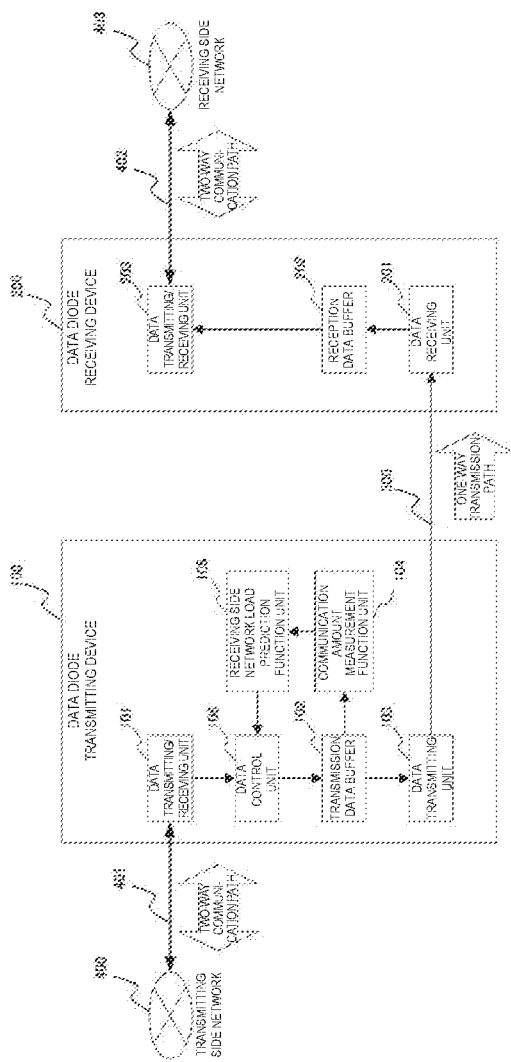
FIG. 1 is a block diagram showing a system configuration of a data diode device according to first, fifth and sixth embodiments of the present invention.
Figure 2:
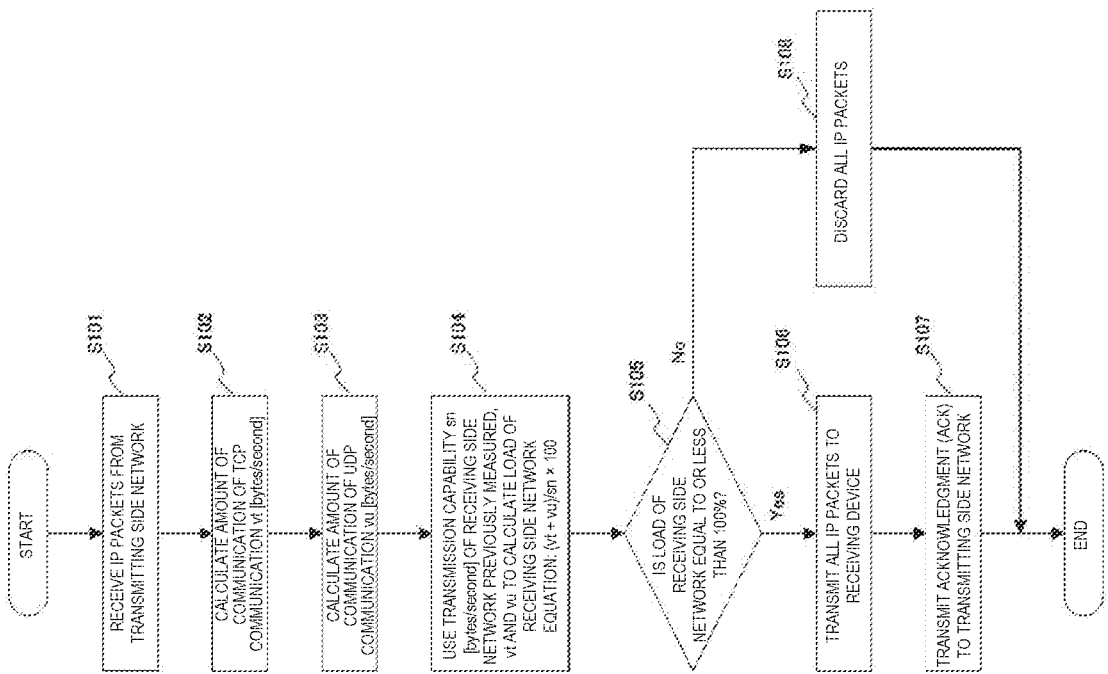
FIG. 2 is a flowchart showing an operation of the first embodiment of the present invention.

FIG. 1 shows a system configuration of the data diode device, in which the data diode device includes a transmitting device 100 of the data diode device, a receiving device 200 of the data diode device, and a one-way transmission path 300 that connects the transmitting device 100 and the receiving device 200.

Further, the data diode device is arranged between a transmitting side network 400 and a receiving side network 403 which are connected to the data diode device through two-way communication paths 401 and 402, respectively.

The transmitting device 100 is constituted by a microprocessor and the like, and includes a data transmitting/receiving unit 101 that transmits/receives data through the two-way communication path 401 to/from the transmitting side network 400, a transmission data buffer 102, and a data transmitting unit 103 that transmits data to the receiving device 200.

Further, the transmitting device 100 includes a communication amount measurement function unit 104 that measures the amount of communication of data sent from the transmitting side network 400 based on the data from the transmission data buffer 102, a receiving side network load prediction function unit 105 that predicts a network load of the receiving side network 403 from the amount of communication measured by the communication amount measurement function unit 104, and a data control unit 106 that discards IP packets of data sent from the transmitting side network 400 to limit communication data when the network load predicted by the receiving side network load prediction function unit 105 is determined to be higher than a predetermined value.

The receiving device 200 includes a data receiving unit 201 that receives data transmitted by the data transmitting unit 103 through a one-way transmission path 300, a reception data buffer 202, and a data transmitting/receiving unit 203 that transmits/receives data through the two-way communication path 402 to/from the receiving side network 403.

Next, the operation of such a data diode device will be described with reference to a flowchart shown in FIG. 2.

First, in step S101, the transmitting device 100 receives IP packets from the transmitting side network 400 at the data transmitting/receiving unit 101, and stores them in the transmission data buffer 102.

Next, in step S102, from the IP (Internet Protocol) packets stored in the transmission data buffer 102, the communication amount measurement function unit 104 calculates the amount of communication of TCP (Transmission Control Protocol) communication vt [bytes/second], and, based on the IP packets stored in the transmission data buffer 102, in step S103, calculates the amount of communication of UDP (User Datagram Protocol) communication vu [bytes/second].

Next, in step S104, the receiving side network load prediction function unit 105 uses transmission capability sn [bytes/second] of the receiving side network 403 that is previously measured and the amount of communication of the TCP communication vt [bytes/second] and the amount of communication of the UDP communication vu [bytes/second] that are calculated in step S102 and step S103 to calculate the load P1 of the receiving side network 403 with the following equation (1):

$$P1=(vt+vu)/sn\times 100 \tag{1}$$

Further, in step S105, the receiving side network load prediction function unit 105 determines whether the load of the receiving side network 403 that is calculated in step S104 is equal to or less than 100%. At this time, if the load of the receiving side network 403 is equal to or less than 100% (Yes), the process proceeds to step S106, in which the data control unit 106 causes the data transmitting unit 103 to transmit all IP packets to the receiving device 200. Further, if there is TCP communication (TCP packet) in the IP packets transmitted in step S106, the data control unit 106 causes the data transmitting/receiving unit 101 to transmit an acknowledgment (ACK) to the transmitting side network 400 in step S107.

On the other hand, in step S105, if the load of the receiving side network calculated in step S104 is greater than 100% (No), the process proceeds to step S108, in which the data control unit 106 causes the transmission data buffer 102 to discard all IP packets stored therein.

Thus, in the invention according to the first embodiment, when the load of the receiving side network 403 is predicted, and the load of the receiving side network 403 is determined to be higher than a predetermined value, the IP packets of the data sent from the transmitting side network 400 are configured to be discarded; with such a configuration, the acknowledgment (ACK) of the TCP communication is not transmitted to the transmitting side network 400. Therefore, in the transmitting side network 400, retransmission processing of the TCP communication becomes possible, thus, packet loss of the TCP communication can be prevented.

Note that, although a threshold used to limit the amount of communication is 100% in this case, the percentage of the threshold may be changed depending on the state of the system.

Second Embodiment

Next, a data diode device according to a second embodiment of the present invention will be described in detail with reference to FIGS. 3 and 4.

In the invention according to the first embodiment, the amount of communication is limited based on the performance of the receiving side network 403, but even if the load of the receiving side network 403 is not high, packet loss may occur due to the performance limit of the receiving device 200. Therefore, in the second embodiment, the load of the receiving device 200 is predicted and the amount of communication is limited, thus, it is possible to prevent packet loss due to the performance limit of the receiving device 200.

Figure 3:
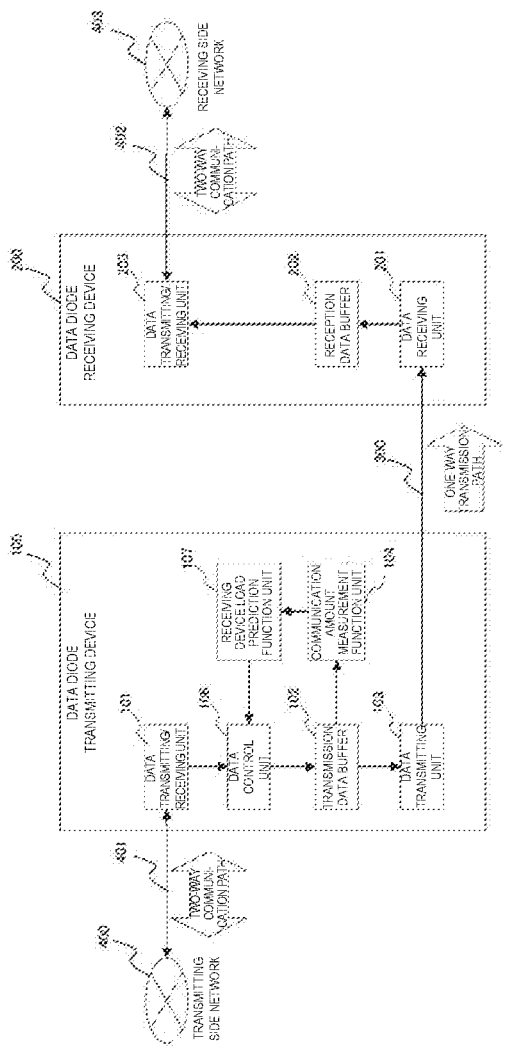
FIG. 3 is a block diagram showing a system configuration of a data diode device according to a second embodiment of the present invention.
Figure 4:
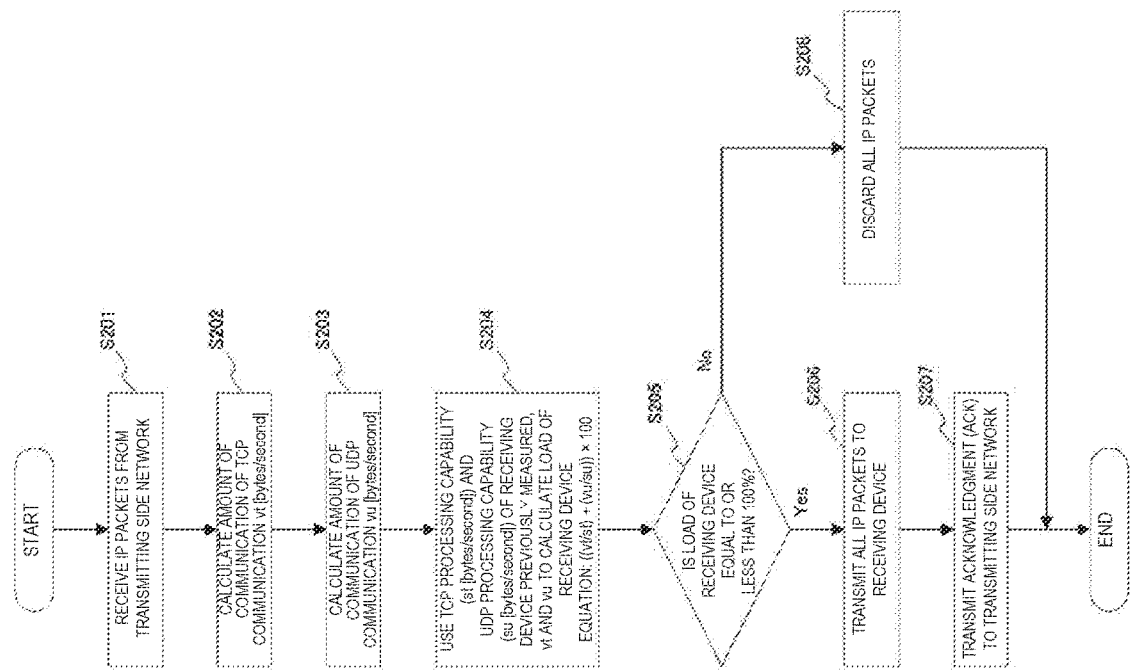
FIG. 4 is a flowchart showing an operation of the second embodiment of the present invention.

FIG. 3 shows a system configuration of the data diode device according to the second embodiment, in which the receiving side network load prediction function unit 105 in the first embodiment is replaced with a receiving device load prediction function unit 107. Since other configuration is the same as that of the first embodiment, the identical or equivalent parts are denoted by the same reference numerals and the description thereof is omitted.

Next, the operation of the data diode device shown in FIG. 3 will be described with reference to a flowchart of FIG. 4.

First, in step S201, the transmitting device 100 receives IP packets from the transmitting side network 400 at the data transmitting/receiving unit 101, and stores them in the transmission data buffer 102.

Next, in step S202, from the IP packets stored in the transmission data buffer 102, the communication amount measurement function unit 104 calculates the amount of communication of TCP communication vt [bytes/second], and, based on the IP packets stored in the transmission data buffer 102, in step S203, calculates the amount of communication of UDP communication vu [bytes/second].

Thereafter, in step S204, the receiving device load prediction function unit 107 uses TCP processing capability st [bytes/second] and UDP processing capability su [bytes/second] of the receiving device 200 that are previously measured, and the amount of communication of the TCP communication vt [bytes/second] and the amount of communication of the UDP communication vu [bytes/second] that are calculated in step S202 and step S203 to calculate the load P2 of the receiving device 200 with the following equation (2):

$$P2=\{(vt/st)+(vu/su)\}\times 100 \qquad (2)$$

Next, in step S205, the receiving device load prediction function unit 107 determines whether the load of the receiving device 200 that is calculated in step S204 is equal to or less than 100%. At this time, if the load of the receiving side network 403 is equal to or less than 100% (Yes), the process proceeds to step S206, in which the data control unit 106 causes the data transmitting unit 103 to transmit all IP packets to the receiving device 200. Further, if there is TCP communication (TCP packet) in the IP packets transmitted in step S206, the data control unit 106 causes the data transmitting/receiving unit 101 to transmit an acknowledgment (ACK) to the transmitting side network 400 in step S207.

On the other hand, in step S205, if the load of the receiving device 200 calculated in step S204 is greater than 100% (No), the process proceeds to step S208, in which the data control unit 106 causes the transmission data buffer 102 to discard all IP packets stored therein.

Thus, in the invention according to the second embodiment, when the load of the receiving device 200 is predicted, and the load of the receiving device 200 is determined to be higher than a predetermined value, the IP packets of the data sent from the transmitting side network 400 are configured to be discarded; with such a configuration, the acknowledgment (ACK) of the TCP communication is not transmitted to the transmitting side network 400. Therefore, in the transmitting side network 400, retransmission processing of the TCP communication becomes possible, thus, packet loss of the TCP communication can be prevented.

Note that the second embodiment may be combined with the function for limiting the amount of communication based on the receiving side network load described in the first embodiment. In addition, although a threshold used to limit the amount of communication is 100%, the percentage of the threshold may be changed depending on the state of the system.

Third Embodiment

Next, a data diode device according to a third embodiment of the present invention will be described in detail with reference to FIGS. 5 and 6.

In the first and second embodiments, when the amount of communication is large, the amount of communication is reduced by discarding all packets, but when all packets are discarded, the connection of the TCP communication may be disconnected, and a communication error may be notified to devices in the transmitting side network.

Therefore, in the third embodiment, a pause frame is generated to limit the TCP communication. By using the pause frame, a communication error can be prevented from being notified to the transmitting side network.

Figure 5:
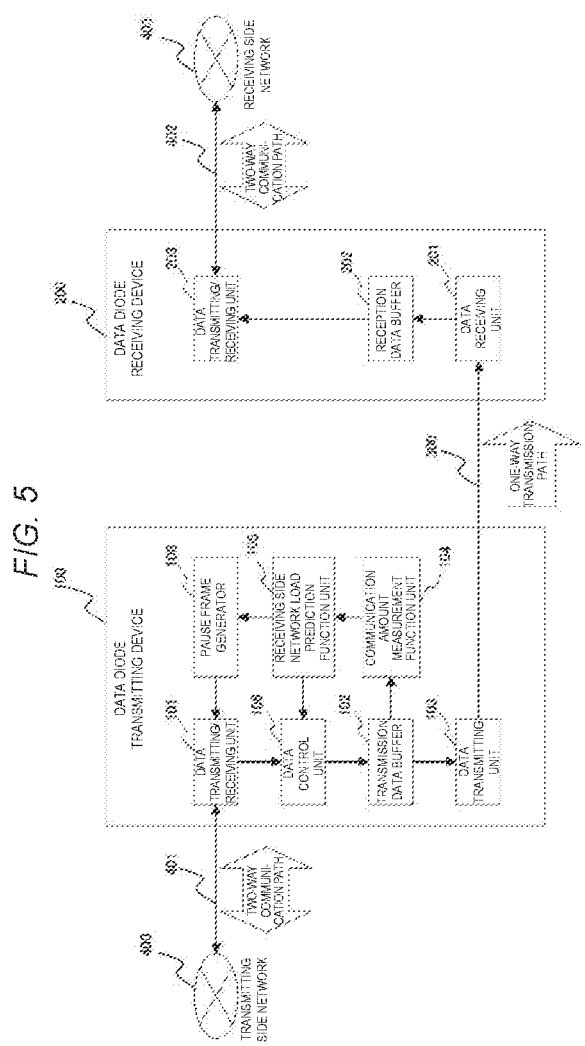
FIG. 5 is a block diagram showing a system configuration of a data diode device according to a third embodiment of the present invention.
Figure 6:
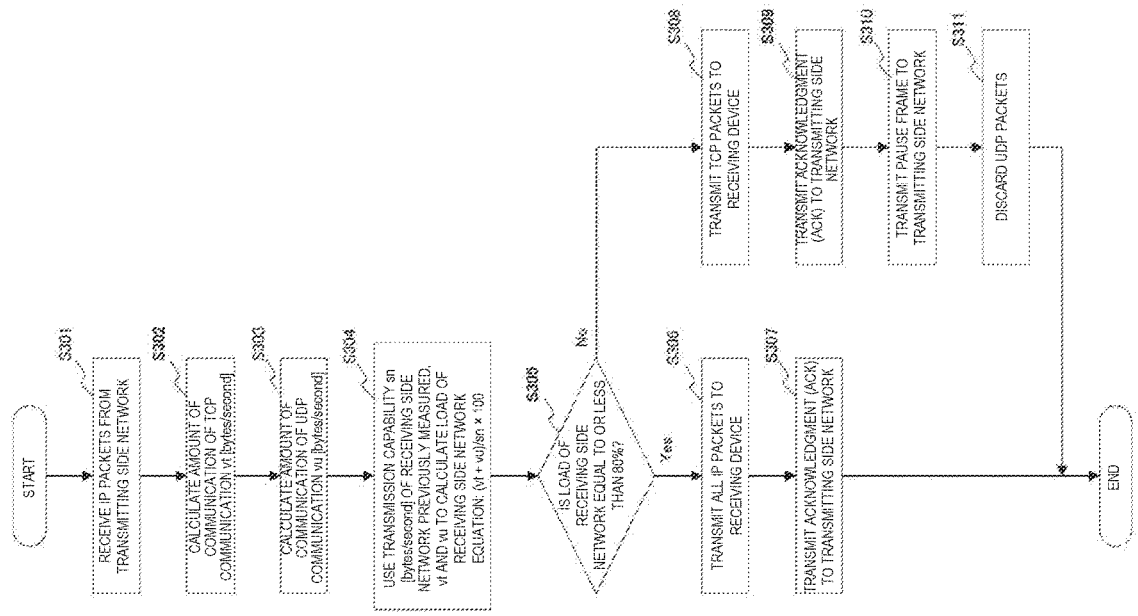
FIG. 6 is a flowchart showing an operation of the third embodiment of the present invention.

FIG. 5 shows a system configuration diagram of the data diode device according to the third embodiment, in which a pause frame generator 108 is added to the configuration of the first embodiment.

That is, if the receiving side network load predicted at the receiving side network load prediction function unit 105 is determined to be higher than a predetermined value, the pause frame generator 108 generates a pause frame, and transmits the pause frame to the transmitting side network 400 through the data transmitting/receiving unit 101. With such a configuration, among IP packets of data sent from the transmitting side network 400, TCP communication can be limited. Note that, since other configuration is the same as that of the first embodiment, the identical or equivalent parts are denoted by the same reference numerals and the description thereof is omitted.

Next, the operation of the data diode device shown in FIG. 5 will be described with reference to a flowchart of FIG. 6.

Since the processes in step S301, step S302, step S303 and step S304 are the same as those in step S101 to step S104 in the first embodiment, the description thereof is omitted.

Next, in step S305, the receiving side network load prediction function unit 105 determines whether the load of the receiving side network 403 that is calculated in step S304 is equal to or less than 80%. At this time, if the load of the receiving side network 403 is equal to or less than 80% (Yes), the process proceeds to step S306, in which the data control unit 106 causes the data transmitting unit 103 to transmit all IP packets to the receiving device 200. Further, if there is TCP communication (TCP packet) in the IP packets transmitted in step S306, the data control unit 106 causes the data transmitting/receiving unit 101 to transmit an acknowledgment (ACK) to the transmitting side network 400 in step S307.

On the other hand, in step S305, if the load of the receiving side network calculated in step S304 is greater than 80% (No), the process proceeds to step S308, in which the data control unit 106 causes the data transmitting unit 103 to transmit TCP communication (TCP packet) among data stored in the transmission data buffer 102 to the receiving device 200. Further, in step S309, the data control unit 106 causes the data transmitting/receiving unit 101 to transmit an acknowledgment (ACK) to the transmitting side network 400.

Next, in step S310, the pause frame generator 108 generates a pause frame, and causes the data transmitting/receiving unit 101 to transmit the pause frame to the transmitting side network 400. Accordingly, by limiting the amount of communication of the TCP communication among the data of the IP packets, the transmitting side network 400 performs transmission to the data transmitting/receiving unit 101.

Thereafter, in step S311, the data control unit 106 causes the transmission data buffer 102 to discard UDP communication (UDP packet) stored therein.

Note that, since TCP communication (TCP packet) may be received before the pause frame is transmitted, a threshold used to limit the amount of communication is set to a value with a margin. In addition, although a threshold used to limit the amount of communication is 80% in this case, the percentage of the threshold may be changed depending on the state of the system.

Further, although, in the third embodiment, when the load of the receiving side network 403 is predicted and the load is determined to be higher than a predetermined value, the amount of communication of the TCP communication is limited, among IP packets transmitted from the transmitting side network 400, as in the second embodiment, when the load of the receiving device 200 is predicted, and the load is determined to be higher than the predetermined value, the amount of communication of the TCP communication may be limited, among IP packets transmitted from the transmitting side network 400.

Fourth Embodiment

Next, a data diode device according to a fourth embodiment of the present invention will be described in detail with reference to FIGS. 7 and 8.

Although, in first and second embodiments, when the amount of communication is large, the amount of communication is reduced by disconnecting/stopping the communication, the amount of communication after the communication is resumed cannot be reduced in this case. Therefore, the communication may be disconnected/stopped again after the communication is resumed.

Thus, in the fourth embodiment, the window size for the TCP communication (TCP packet) is reduced when the communication is limited. By reducing the window size, the amount of communication of the TCP communication is reduced, thus, the load of the receiving device 200 and the receiving side network 403 can be reduced. As a result, it is possible to reduce the possibility that the communication is continuously disconnected/stopped.

Figure 7:
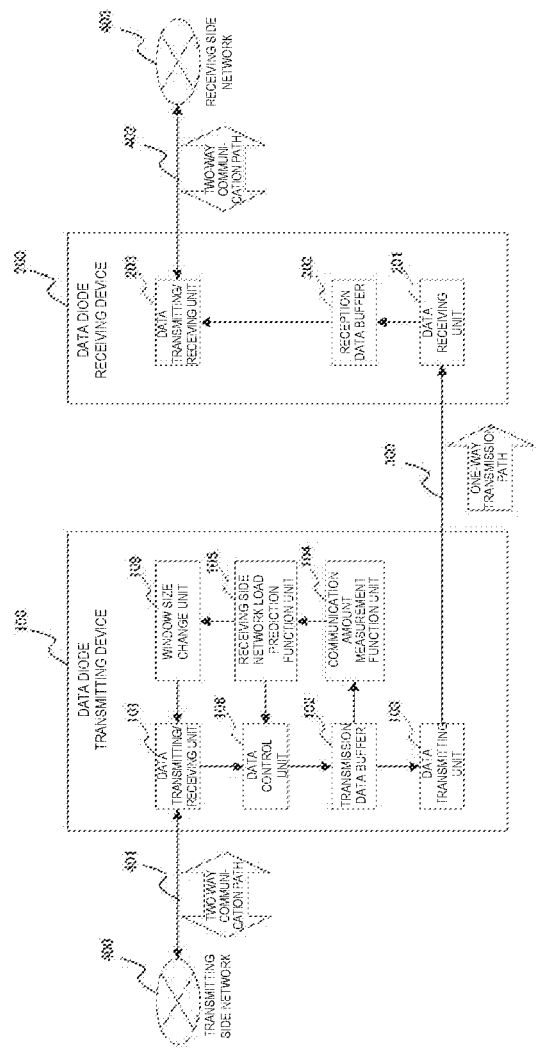
FIG. 7 is a block diagram showing a system configuration of a data diode device according to a fourth embodiment of the present invention.
Figure 8:
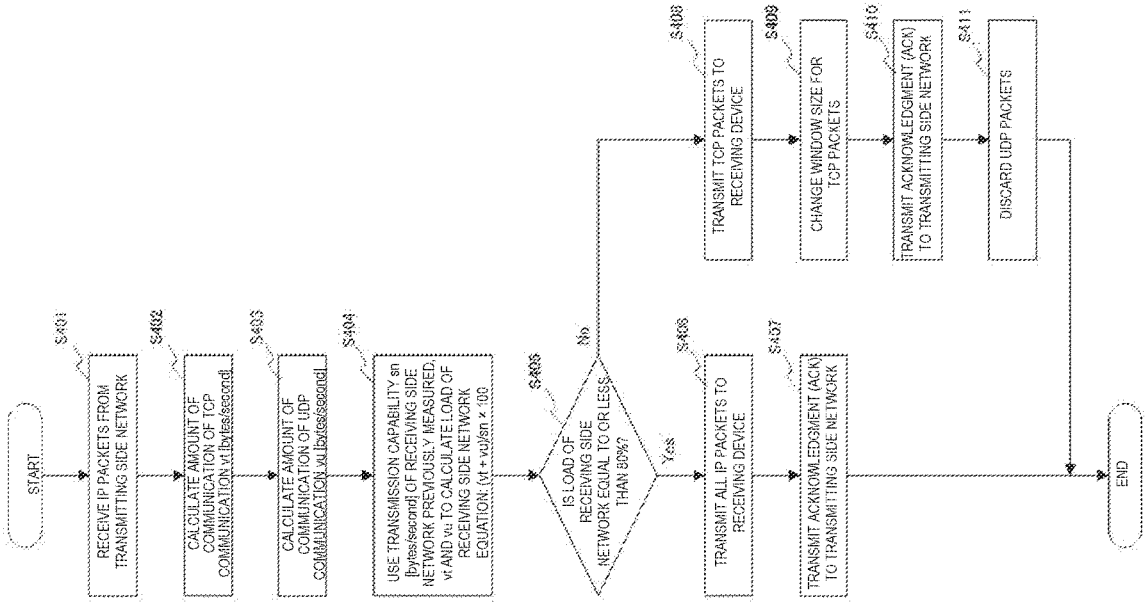
FIG. 8 is a flowchart showing an operation of the fourth embodiment of the present invention.

FIG. 7 shows a system configuration diagram of the data diode device according to the fourth embodiment, in which a window size change unit 109 is added to the configuration of the first embodiment.

That is, the window size change unit 109 is provided, which changes the window size for the TCP communication in the IP packets when the predicted receiving side network load is determined to be higher than a predetermined value in the receiving side network load prediction function unit 105. The window size change unit 109 changes the window size for the TCP communication in data sent from the transmitting side network 400, and adjusts the amount of communication of the TCP communication. Note that, since other configuration is the same as that of the first embodiment, the identical or equivalent parts are denoted by the same reference numerals and the description thereof is omitted.

Next, the operation of the data diode device shown in FIG. 7 will be described with reference to a flowchart of FIG. 8.

Since the processes in step S401, step S402, step S403 and step S404 are the same as those in step S101 to step S104 in the first embodiment, the description thereof is omitted.

In step S405, the receiving side network load prediction function unit 105 determines whether the load of the receiving side network 403 that is calculated in step S404 is equal to or less than 80%. At this time, if the load of the receiving side network 403 is equal to or less than 80% (Yes), the process proceeds to step S406, in which the data control unit 106 causes the data transmitting unit 103 to transmit all IP packets to the receiving device 200. Further, if there is TCP communication (TCP packet) in the transmitted IP packets, the data control unit 106 causes the data transmitting/receiving unit 101 to transmit an acknowledgment (ACK) to the transmitting side network 400 in step S407.

On the other hand, in step S405, if the load of the receiving side network calculated in step S404 is greater than 80% (No), the process proceeds to step S408, in which the data control unit 106 causes the data transmitting unit 103 to transmit TCP communication (TCP packet) among data in the transmission data buffer 102 to the receiving device 200. Thereafter, in step S409, the window size change unit 109 changes the window size for the TCP communication in data sent from the transmitting side network 400.

Next, in step S410, the data control unit 106 causes the data transmitting/receiving unit 101 to transmit an acknowledgment (ACK) to the transmitting side network 400, and, in step S411, causes the transmission data buffer 102 to discard UDP communication (UDP packet) stored therein.

Note that, since there is a time difference between the change of the window size and the reduction in the amount of communication, a threshold used to limit the amount of communication is set to a value with a margin. In addition, although a threshold used to limit the amount of communication is 80% in this case, the percentage of the threshold may be changed depending on the state of the system. Alternatively, the window size may be increased while observing the amount of communication.

Further, although, in the fourth embodiment, when the load of the receiving side network 403 is predicted and the load is determined to be higher than a predetermined value, the window size for the IP packets transmitted from the transmitting side network 400 is changed, as in the second embodiment, when the load of the receiving device 200 is predicted, and the load is determined to be higher than the predetermined value, the window size for the IP packets transmitted from the transmitting side network 400 may be changed to limit the amount of communication of the TCP communication.

Fifth Embodiment

Figure 9:
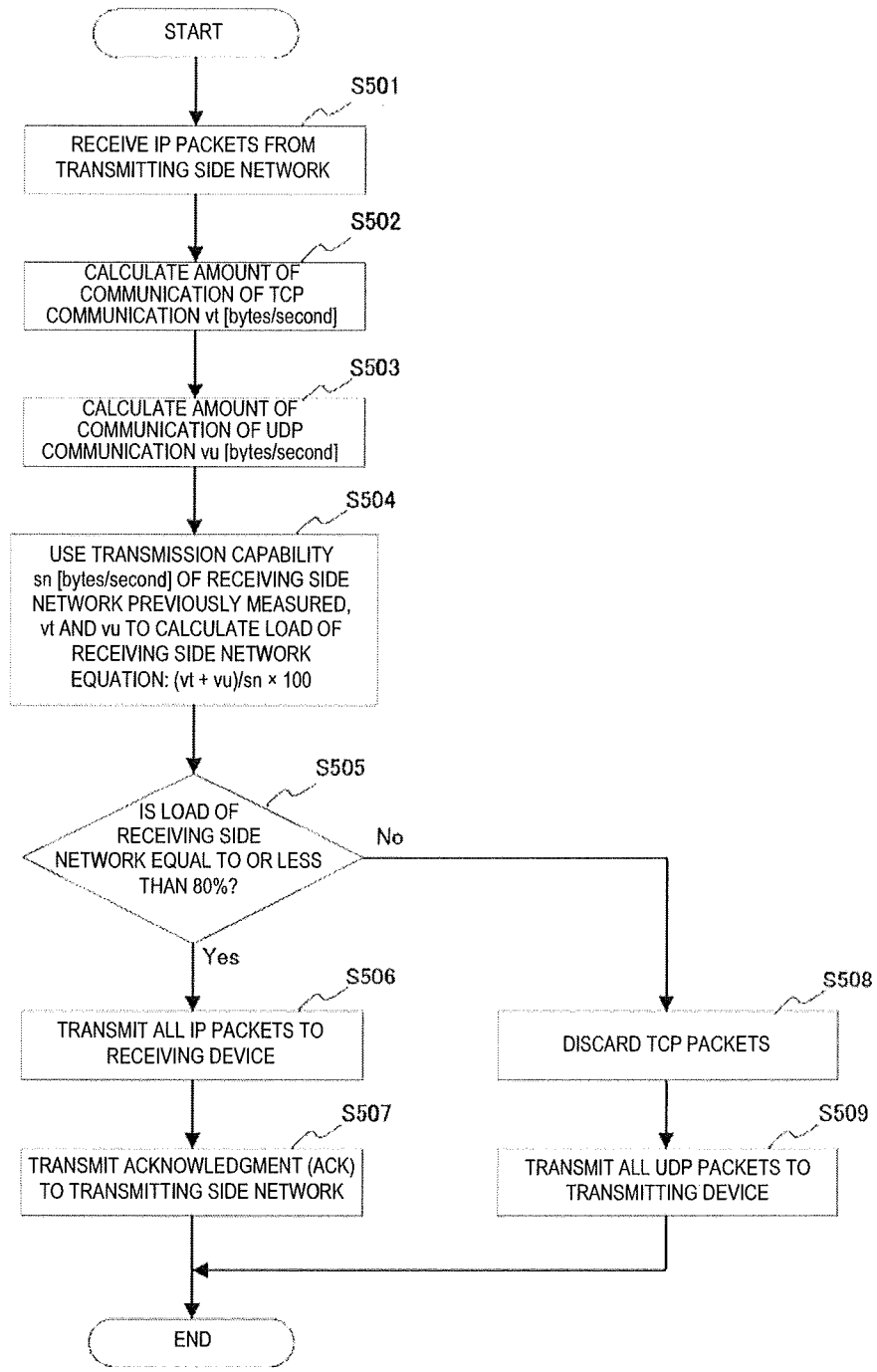
FIG. 9 is a flowchart showing an operation of a fifth embodiment of the present invention.

Next, a data diode device according to a fifth embodiment of the present invention will be described in detail with reference to FIG. 9.

Although, in first, second, third and fourth embodiments, when the amount of communication is large, UDP packets are discarded, since a retransmission process is performed in TCP communication, even if a TCP packet is discarded in the transmitting device 100, another TCP packet is retransmitted from the transmitting side network 400. However, since no retransmission is performed in UDP communication, if a UDP packet is discarded in the transmitting device 100, the data is lost.

Therefore, in the fifth embodiment, when the load of the receiving device 200 or the receiving side network 403 is determined to be higher than a predetermined value, only TCP communication is limited and UDP communication is not limited. By limiting the TCP communication in this way, the packet loss of the UDP packet in the transmitting device 100 may be prevented while reducing the load of the receiving device 200 or the receiving side network 403.

The system configuration of the data diode device according to the fifth embodiment is the same as that of the first embodiment shown in FIG. 1.

Next, the operation in the fifth embodiment will be described with reference to the flowchart of FIG. 9.

Since the processes in step S501, step S502, step S503 and step S504 are the same as those in step S101 to step S104 in the first embodiment, the description thereof is omitted.

In step S505, the receiving side network load prediction function unit 105 determines whether the load of the receiving side network 403 that is calculated in step S504 is equal to or less than 80%. At this time, if the load of the receiving side network 403 is equal to or less than 80% (Yes), the process proceeds to step S506, in which the data control unit 106 causes the data transmitting unit 103 to transmit all IP packets to the receiving device 200. Further, if there is TCP communication (TCP packet) in the IP packets transmitted in step S506, the data control unit 106 causes the data transmitting/receiving unit 101 to transmit an acknowledgment (ACK) to the transmitting side network 400 in step S507.

On the other hand, in step S505, if the load of the receiving side network calculated in step S504 is greater than 80% (No), the process proceeds to step S508, in which the data control unit 106 causes the transmission data buffer 102 to discard TCP communication (TCP packet) among data therein.

Next, in step S509, the data control unit 106 causes the data transmitting unit 103 to transmit UDP packets to the receiving device 200.

Note that, since the data transmitting unit 103 continues to transmit UDP packets, a threshold used to limit the amount of communication is set to a value with a margin. In addition, although a threshold used to limit the amount of communication is 80% in this case, the percentage of the threshold may be changed depending on the state of the system. Further, this may be combined to the limitation of the TCP communication shown in the third and fourth embodiments.

Further, although, in the fifth embodiment, when the load of the receiving side network 403 is predicted and the load is determined to be higher than a predetermined value, TCP packets are discarded, among IP packets transmitted from the transmitting side network 400, as in the second embodiment, when the load of the receiving device 200 is predicted, and the load is determined to be higher than the predetermined value, TCP packets may be discarded, among IP packets transmitted from the transmitting side network 400.

Sixth Embodiment

Figure 10:
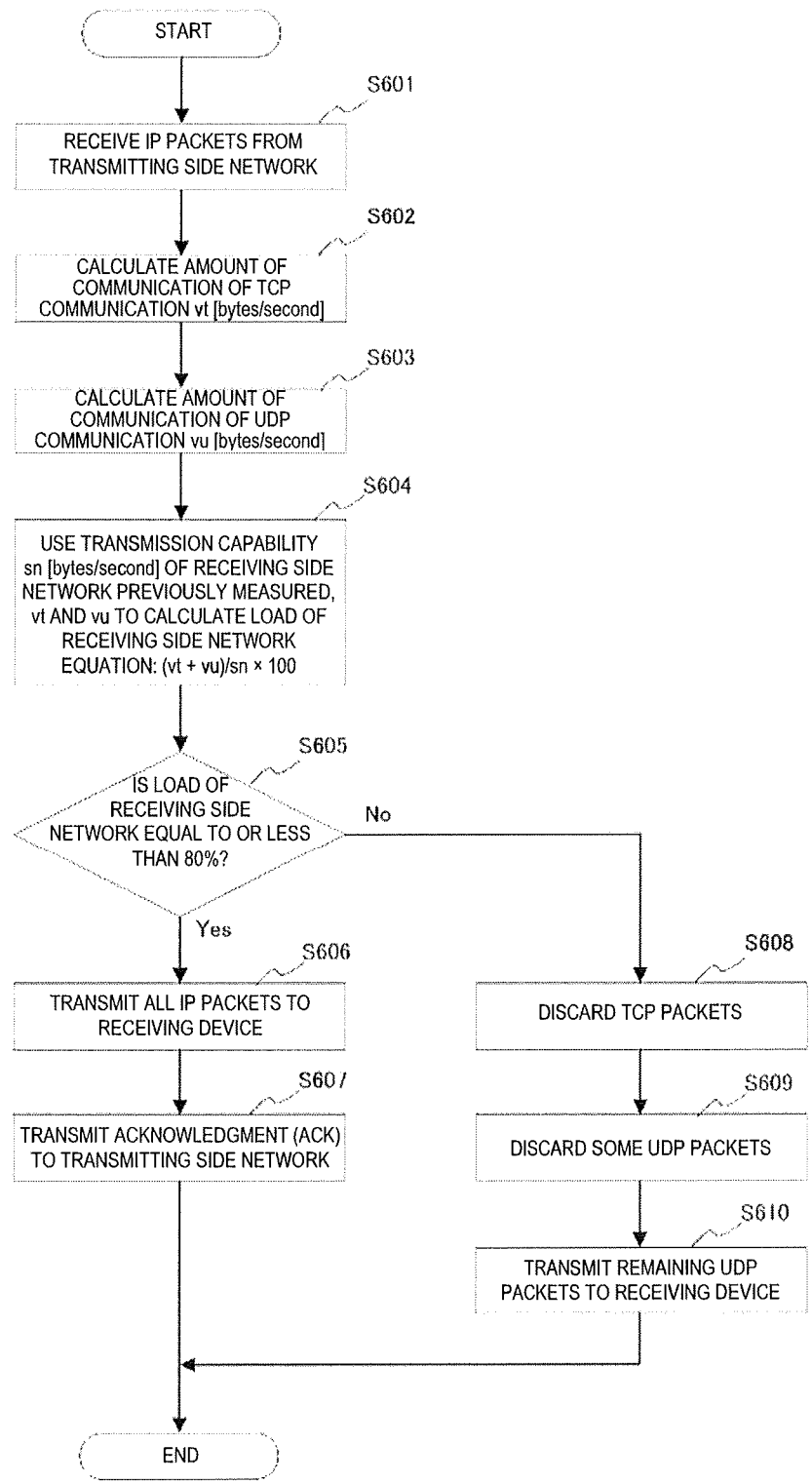
FIG. 10 is a flowchart showing an operation of a sixth embodiment of the present invention.

Next, a data diode device according to a sixth embodiment of the present invention will be described in detail with reference to FIG. 10.

In the fifth embodiment, UDP communication is continued even if the amount of communication is large, the amount of communication is not reduced, thus, packet loss may occur at the receiving device side. In addition, in UDP communication, time-series data is often transmitted, therefore, it is necessary to prevent data from being lost for some long period of time.

Therefore, in the sixth embodiment, UDP packets are discarded at regular intervals when the amount of communication is large. Accordingly, it is possible to reduce the amount of communication while preventing data from being lost for some long period of time.

The system configuration of the data diode device according to the sixth embodiment is the same as that shown in FIG. 1.

Next, the operation of the sixth embodiment will be described with reference to the flowchart of FIG. 10.

Since the processes in step S601, step S602, step S603 and step S604 are the same as those in step S101 to step S104 in the first embodiment, the description thereof is omitted.

In step S605, the receiving side network load prediction function unit 105 determines whether the load of the receiving side network 403 that is calculated in step S604 is equal to or less than 80%. At this time, if the load of the receiving side network 403 is equal to or less than 80% (Yes), the process proceeds to step S606, in which the data control unit 106 causes the data transmitting unit 103 to transmit all IP packets to the receiving device 200. Further, if there is TCP communication (TCP packet) in the IP packets transmitted in this step S606, the data control unit 106 causes the data transmitting/receiving unit 101 to transmit an acknowledgment (ACK) to the transmitting side network 400 in step S607.

On the other hand, in step S605, if the load of the receiving side network calculated in step S604 is greater than 80% (No), the process proceeds to step S608, in which the data control unit 106 causes the transmission data buffer 102 to discard TCP communication (TCP packet) among data therein.

Further, in step S609, the data control unit 106 causes some UDP packets to be discarded. Further, in step S610, the data control unit 106 causes the data transmitting unit 103 to transmit the remaining UDP packets to the receiving device 200.

Note that, since the data transmitting unit 103 continues to transmit UDP packets, a threshold used to limit the amount of communication is set to a value with a margin. In addition, although a threshold used to limit the amount of communication is 80% in this case, the percentage of the threshold may be changed depending on the state of the system. Further, this may be combined to the function for limiting TCP communication shown in the third and fourth embodiments.

Moreover, although, in the sixth embodiment, when the load of the receiving side network 403 is predicted and the load is determined to be higher than a predetermined value, TCP packets are discarded, among IP packets transmitted from the transmitting side network 400, as in the second embodiment, when the load of the receiving device 200 is predicted, and the load is determined to be higher than the predetermined value, TCP packets may be discarded, among IP packets transmitted from the transmitting side network 400. Furthermore, the same applies to the discard of a UDP packet.

While embodiments of the invention have been described, the invention is not limited to the embodiments, and various design changes may be made, and each embodiment may be combined freely and may be changed, omitted and the like without departing from the spirit of the inventions.

REFERENCE SIGNS LIST

100: Data Diode Transmitting Device
101: Data Transmitting/Receiving Unit
102: Transmission Data Buffer
103: Data Transmitting Unit
104: Communication Amount Measurement Function Unit
105: Receiving Side Network Load Prediction Function Unit
106: Data Control Unit
107: Receiving Device Load Prediction Function Unit
108: Pause Frame Generator
109: Window Size Change Unit
200: Data Diode Receiving Device
201: Data Receiving Unit
202: Reception Data Buffer
203: Data Transmitting/Receiving Unit
300: One-Way Transmission Path
400: Transmitting Side Network
401, 402: Two-Way Communication Path
403: Receiving Side Network

The invention claimed is:

1. A data diode device that is installed between a transmitting side network and a receiving side network, and includes a transmitting device, and a receiving device, wherein the data diode device permits data to be transmitted from the transmitting side network to the receiving side network and prevents data from being transmitted from the receiving side network to the transmitting side network, wherein the transmitting device comprises a receiving device load prediction function unit that predicts a load of the receiving device from an amount of data communication sent from the transmitting side network, and a data control unit that discards IP packets of data sent from the transmitting side network when the load of the receiving device predicted by the receiving device load prediction function unit is determined to be higher than a predetermined value, wherein the receiving device load prediction function unit uses an amount of TCP communication vt [bytes/second] and an amount of UDP communication vu [bytes/second] of data sent from the transmitting side network, and TCP processing capability st [bytes/second] and UDP processing capability su [bytes/second] of the receiving device that are previously measured to calculate a load P2 of the receiving device with the following equation:

$$P2=\{(vt/st)+(vu/su)\}\times 100.$$

2. The data diode device of claim 1, further comprising a one-way transmission path within the data diode device between the transmitting device and the receiving device, wherein the data diode device is configured to permit two-way communication between the transmitting device and the transmitting side network, and wherein the data diode device is configured to permit two-way communication between the receiving device and the receiving side network.

3. A data diode device that is installed between a transmitting side network and a receiving side network, and includes a transmitting device, and a receiving device, wherein the data diode device permits data to be transmitted from the transmitting side network to the receiving side network and prevents data from being transmitted from the receiving side network to the transmitting side network, wherein the transmitting device comprises a receiving device load prediction function unit that predicts a load of the receiving device from an amount of data communication sent from the transmitting side network, and a pause frame generator that generates a pause frame when the load of the receiving device predicted by the receiving device load prediction function unit is determined to be higher than a predetermined value, wherein the pause frame generator limits TCP communication, among IP packets of data sent from the transmitting side network, wherein the receiving device load prediction function unit uses an amount of TCP communication vt [bytes/second] and an amount of UDP communication vu [bytes/second] of data sent from the transmitting side network, and TCP processing capability st [bytes/second] and UDP processing capability su [bytes/second] of the receiving device that are previously measured to calculate a load P2 of the receiving device with the following equation:

$$P2=\{(vt/st)+(vu/su)\}\times 100.$$

4. The data diode device of claim 3, further comprising a one-way transmission path within the data diode device between the transmitting device and the receiving device, wherein the data diode device is configured to permit two-way communication between the transmitting device and the transmitting side network, and wherein the data diode device is configured to permit two-way communication between the receiving device and the receiving side network.

5. A data diode device that is installed between a transmitting side network and a receiving side network, and includes a transmitting device, and a receiving device, wherein the data diode device permits data to be transmitted from the transmitting side network to the receiving side network and prevents data from being transmitted from the receiving side network to the transmitting side network, wherein the transmitting device comprises a receiving device load prediction function unit that predicts a load of the receiving device from an amount of data communication sent from the transmitting side network, and a window size change unit that changes the window size for TCP communication in IP packets when the load of the receiving device predicted by the receiving device load prediction function unit is determined to be higher than a predetermined value, wherein the window size change unit changes the window size for the TCP communication in data sent from the transmitting side network, and adjusts an amount of the TCP communication, wherein the receiving device load prediction function unit uses an amount of TCP communication vt [bytes/second] and an amount of UDP communication vu [bytes/second] of data sent from the transmitting side network, and TCP processing capability st [bytes/second] and UDP processing capability su [bytes/second] of the receiving device that are previously measured to calculate a load P2 of the receiving device with the following equation:

$$P2=\{(vt/st)+(vu/su)\}\times 100.$$

6. The data diode device of claim 5, further comprising a one-way transmission path within the data diode device between the transmitting device and the receiving device, wherein the data diode device is configured to permit two-way communication between the transmitting device and the transmitting side network, and wherein the data diode device is configured to permit two-way communication between the receiving device and the receiving side network.

* * * * *